INVENTORS
DONALD H. HANSEN
WILLIAM E. BAUMGARTNER
BY

ATTORNEY

March 10, 1970  D. H. HANSEN ET AL  3,499,715
RADIUS MEASURING MICROSCOPE

Filed May 4, 1967  2 Sheets-Sheet 2

INVENTORS.
DONALD H. HANSEN
WILLIAM E. BAUMGARTNER
BY
*J. Albert Hultquist*
ATTORNEY

United States Patent Office 3,499,715
Patented Mar. 10, 1970

3,499,715
RADIUS MEASURING MICROSCOPE
Donald H. Hansen, Williamsville, and William E. Baumgartner, Buffalo, N.Y., assignors to American Optical Company, Southbridge, Mass., a corporation of Delaware
Filed May 4, 1967, Ser. No. 636,184
Int. Cl. G01b 11/02
U.S. Cl. 356—171                                    10 Claims

ABSTRACT OF THE DISCLOSURE

A microscope for measuring the radius of surface curvature of a lens or similar specimen. An adjustable radius indicating scale is incorporated in the microscope system together with means for forming an image of the scale in the field of an eyepiece thereof.

BACKGROUND OF THE INVENTION

Field of the invention

Microscopic examination of curved specimen surfaces with particular reference being made to improvements in microscopes used for measuring the radii of curvature of lens surfaces.

Description of the prior art

Radius measuring microscopes are fitted with vertical illuminators by means of which an aerial image of a reticle is produced in a focal plane at a given distance below the microscope odjective.

By adjusting the objective toward and away from the curved surface of a lens or a similar specimen under test, two images of the reticle may be successively formed in the microscope eyepiece.

One image is formed in the eyepiece by bringing the aforesaid aerial image of the reticle into real focus upon the specimen surface and the other by focusing the microscope objective upon an image of the reticle produced by reflection from the specimen surface.

As it is well konwn in the art, the distance that the microscope objective is required to be moved from a setting used to form one of the images to a setting used to form the other of the two images is exactly equal to the radius of curvature of the specimen surface.

While the aforesaid distance which the microscope objective is moved is, as just mentioned, exactly equal to radius of curvature of the specimen surface, it has been a repressive problem to measure this distance accurately. Devices employed for this purpose have included scales and verniers or dial indicators mounted externally upon the microscope chassis, the latter being shown in Patent No. 3,019, 208, for example.

In being effected by mechanical lost motion or play in moving parts of the microscope operating mechanism and/or in the last mentioned indicator itself, the high precision of exactness in radial measurement performed by the microscope optical system is, at least to some extent, defeated by mechanical limitations in the accuracy of prior art indicating devices. Added to this is a margin of error attending the operators' having to look at two observation points (the eyepiece and the external scale or dial) with the necessity for reaccommodation of the eye following each observation.

With the aforesaid drawbacks of prior art radius measuring microscopy in mind, and others which may become apparent hereinafter, it will be appreciated from the following description that the present invention has been directed principally toward improvements in radius indicating systems for radius measuring microscopes whereby the high degree of precision in radial measurement performed by the microscope optical system itself may be read with a correspondingly high degree of precision.

It will also become apparent that other advantages of the present invention include greater ease and simplicity of operation of the instrument and the involvement of considerably less operating time and fatigue to the operator.

SUMMARY OF THE INVENTION

The present invention substantially, if not entirely, eliminates mechanical and human error factors in the mechanism and operation respectively of a radius measuring microscope. This is accomplished by the provision of a radius measuring scale operated directly by the objective lens mount or nosepiece of the microscope and an optical projection system by means of which a focused composite image of the scale and of an index mark, also provided, is presented in the microscope eyepiece simultaneously with the image of the reticle projected on the specimen. Thus, without removing his eye from the microscope eyepiece, an operator can bring into focus in the eyepiece each of the aforementioned two images of the reticle and simultaneously read from the image of the scale, the scale reading for each image of the reticle. The difference between the two such readings is the distance which the microscope objective was required to be moved to form first one and then the other of the two reticle images and is equal to the radius of curvature of the specimen.

A similar technique can be used for determining the depth of a hole in a specimen. By using diffuse light from the illuminator and focusing just on the bottom of the hole in the specimen, reading the scale and then focusing on the upper rim of the hole, and again reading the scale and substracting the two readings, an accurate reading of the depth of the hole can be obtained.

The present invention will be more fully understood by reference to the accompanying drawing and following detailed description of an actual embodiment thereof.

DESCRIPTION OF THE PREFERRED EMBODIMENT

Figure 1:
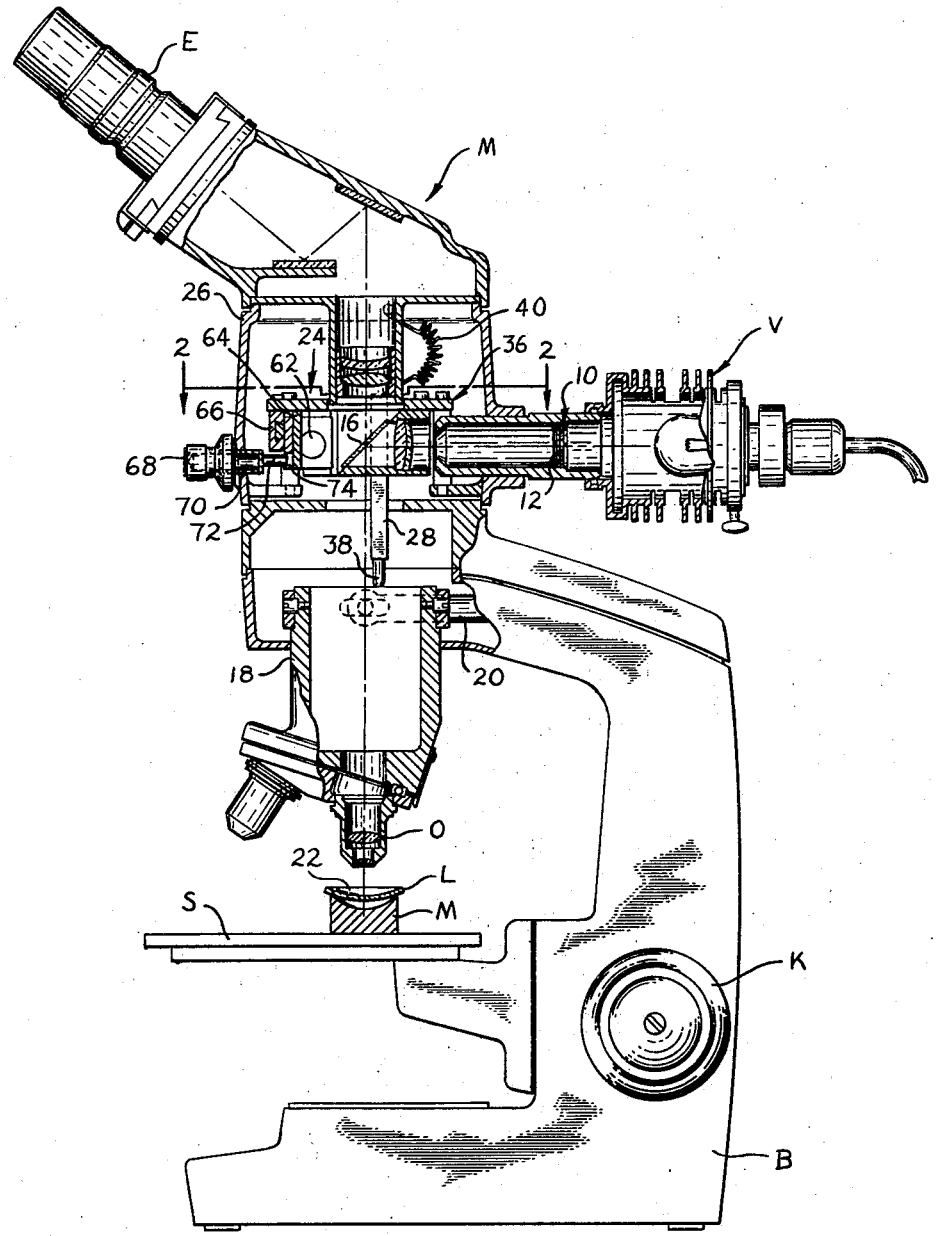
FIG. 1 illustrates in side elevation and partly in section an embodiment of the present invention.

In the drawing there is shown radius measuring microscope M having a typical optical projection assemblage into which there is incorporated a presently preferred embodiment of a radius of curvature indicating system featuring the present inventive concept.

Exclusive of the featured indicating system, microscope M has the usual base B, stage S, objective O and eyepiece E; the latter being either monocular or binocular.

Figure 2:
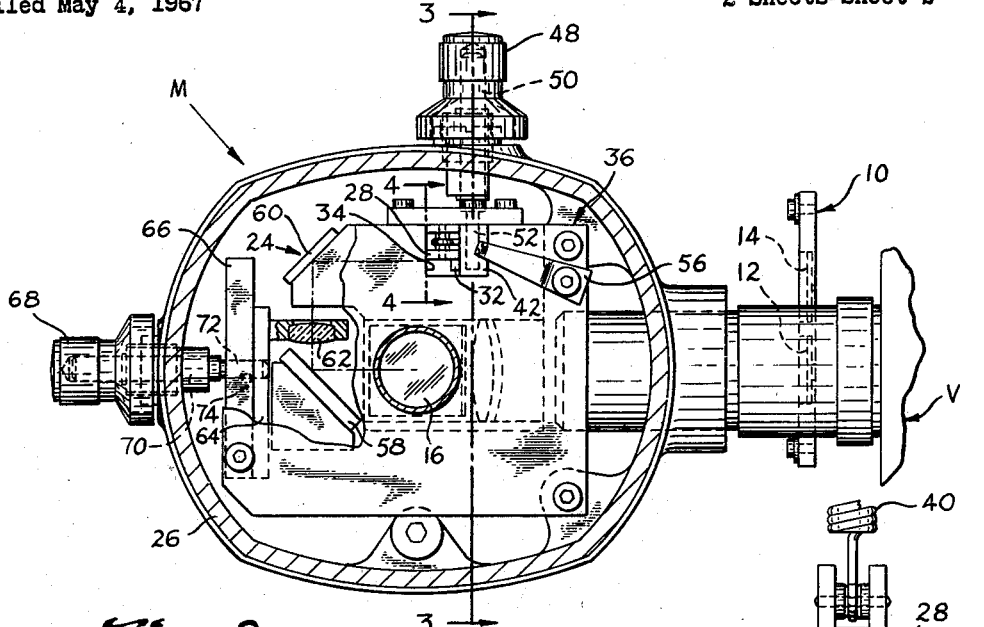
FIG. 2 is a cross-sectional view taken generally along line 2—2 of FIG. 1.

As it is customary in radius measuring microscopes, vertical illuminator V is fitted to microscope M. It has slide 10 (FIGS. 1 and 2) supporting two reticles 12 and 14, one of large aperture and the other of small aperture which, in recognized fashion, are selectively positioned in the optical path of illuminator V respectively for general use and use when examining restricted areas of a specimen.

Beam splitter 16, also in recognized fashion, directs light forming an image of reticle 12 or 14 through objective O whereupon an aerial image of the reticle is formed by the objective in a plane at a predetermined distance therebelow. Reticle 12 is illustrated as being in a position of use.

For convenience in supporting lens L in a stable position beneath objective O, a support block M concave on its upper surface may be placed on stage S. When the specimen has a flat lower surface block M may be removed and the specimen placed directly on the stage.

Nosepiece 18 carrying objective O is adjustable toward and away from a specimen such as lens L supported on stage S. Operating knob K linked to nosepiece 18 by lever arm 20 is used to raise and lower objective O in the usual manner. The details of this linkage form no part of the present invention but those interested in further details may find them disclosed in Patent No. 3,135,817.

Nosepiece 18 is first positioned to a setting where the aforesaid aerial image of reticle 12, as viewed in eyepiece E, is brought to focus directly upon surface 22 of lens L. Then, nosepiece 18 is readjusted to a setting where objective O is focused on a second image of reticle 12 which is formed by reflection from surface 22. While this procedure may be reversed, it is, in either case, the actual distance which nosepiece 18 is moved from one of the aforesaid settings to the other which represents an exact linear measurement of the radius of curvature of surface 22.

This distance is measured according to the present inventive concept through the provision of an indicating system 24 disposed within housing 26.

Figure 4:
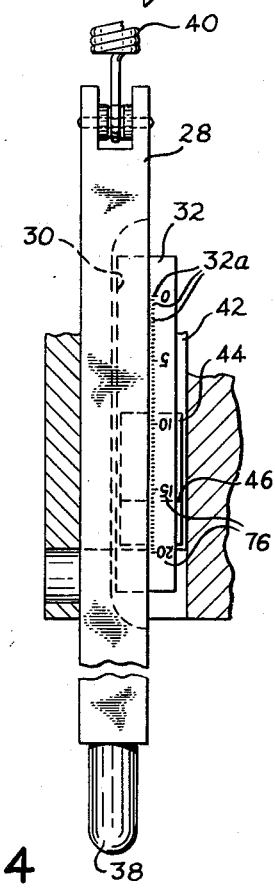
FIG. 4 is another fragmentary cross-sectional view taken along line 4—4 of FIG. 2.

This system comprises movable slide 28 (FIGS. 1, 2 and 4) having cutout 30, see FIG. 4, into which transparent scale 32 is fitted and secured for movement with the slide.

Slide 28 is disposed vertically in guideway 34 (FIG. 2) of fixture 36 with its depending end 38 (FIGS. 1 and 4) in direct contact with nosepiece 18. Compression spring 40 resiliently constantly urges end 38 of slide 28 firmly against nosepiece 40. Thus, movement of nosepiece 18 is, without lost motion, perfectly duplicated by slide 28.

Figure 3:
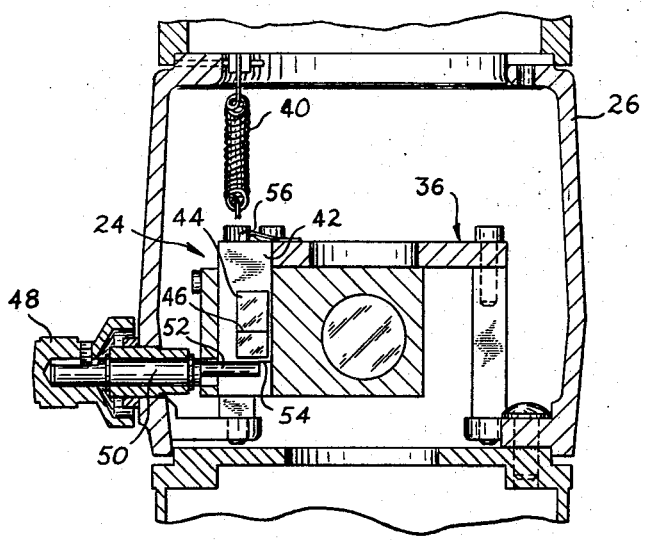
FIG. 3 is a fragmentary cross-sectional view taken along line 3—3 of FIG. 2.

Behind slide 28 and against scale 32 is a second slide 42 (FIGS. 2, 3 and 4) in guideway 34. Slide 42 carries plate 44 having a reference mark or index line 46 thereon.

Slide 42 is independently vertically adjustable relative to slide 28 (i.e. relative to scale 32) for aligning or registering index line 46 with a preselected adjacent one of graduations 32a of scale 32. It is operated by knob 48 (FIGS. 2 and 3) on shaft 50 which is journaled in housing 26. Eccentric end 52 of shaft 50 engages bottom 54 (FIG. 3) of slide 42. Slide 42 is constantly resiliently held firmly against end 52 of shaft 50 by flat spring 56. Rotation of knob 48 through 180° from the position illustrated in FIG. 3 causes spring biased slide 42 to assume its lowermost position in guideway 34. The eccentricity of end 52 is rendered sufficient to effect movement of line 46 over a distance at least equal to that of one of the spacings between two adjacent or successive graduations 32a.

Index line 46 is visible through transparent scale 32 and a composite image of scale 32 and line 46 is focused in eyepiece E at all times. Line 46 and graduations 32a are opaque and highly reflective to light.

Scale 32 and plate 44 are diffusely illuminated by light from illuminator V passing through beam splitter 16 and directed by mirrors 58 and 60 to scale 32 and plate 44. All structural members surrounding the path of light from beam splitter 16 through scale 32 and behind plate 44 are coated with a deep black non-reflective coating as well understood in the art to prevent reflections from dimming the image of scale markings 32a and index line 46.

Objective lens 62 forms the aforesaid composite image of scale 32 and line 46 in eyepiece E utilizing the optical path provided by mirrors 60 and 58 and beam splitter 16.

Objective lens 62, being mounted on slide 64 which is dovetailed in stationary slideway 66, is adjustable in the aforesaid optical path so as to permit the microscope operator to achieve a sharp focus of the composite image of scale 32 and index line 46 in eyepiece E. Focusing knob 68 is used to make this adjustment. Knob 68 is fixed upon one end of shaft 70 which has an eccentric opposite end 72 intimately engaged in slot 74 provided therefor in slide 64. Rotation of knob 68 displaces eccentric end 72 of shaft 70 to the right and left as viewed from the front of microscope M thereby effecting a corresponding focusing movement of objective lens 62 which is carried by slide 64.

Operation of the instrument.—With nosepiece 18 of the microscope adjusted so that the aforesaid aerial image of reticle 12 is, as viewed in eyepiece E, determined to be focused upon surface 22 of lens L, knob 48 is operated to bring index line 46 into registry with a nearest one of graduations 32a while looking at the image of scale 32 and line 46 in eyepiece E.

Notice is taken as to which of these graduations is so registered with line 46 so that it may be considered as being a zero line (if it happens not to be so marked on scale 32) from which the radius of curvature of surface 22 is ultimately measured.

While still looking into eyepiece E, nosepiece 18 is adjusted to the point where the microscope is seen to be focused upon an image of reticle 12 produced by reflection from surface 22 of lens L. Thereupon graduations are counted from the aforesaid zero line to the new point of registry of index line 46 with scale 32. This gives a measure of the distance which nosepiece 28 is moved and consequently a measure of the radius of curvature of surface 22. Scale 32 may, of course, be marked with numerals 76 (FIG. 4) to facilitate reading thereof. The inverted relationship of numerals 76 which is shown in FIG. 4 will, as a natural result of projection through system 24, be righted in the image thereof which is viewed in eyepiece E. Scale 32 may be graduated in increments of fractions of millimeters or in thousandths or other fractions of inches, whichever is desired.

It should be understood that, as in the case of all radius measuring microscopes the presently described instrumentation may be used to measure the radii of curvature of convex surfaces as well as concave surface 22 of lens L. The latter has been shown for purposes of illustration only.

We claim:

1. In a radius measuring microscope having a stage and an optical assemblage within a housing including an eyepiece, vertical illuminator and an objective in a nosepiece which is movable toward and away from a curved surface of a specimen supported on said stage selectively over a distance equal to the radius of curvature of said specimen surface, the improvement in a system for indicating measurement of said distance comprising:

a scale and index means in said housing, said scale and index means being movable one relative to the other, said one being actuable by said nosepiece for duplicating said movement thereof and affording, with reference to the other, a measure of said distance; and optical projection means optically coupled with said optical assemblage acting to form an image of said scale and index means in said eyepiece for reading the measure of said distance.

2. A radius measuring miscroscope as recited in claim 1 wherein said scale is carried by a first slide having one of oppositely disposed ends thereof forcefully continually held in contact with said nosepiece for following without lost motion said movement of said nosepiece.

3. A radius measuring microscope as recited in claim 2 wherein said one end of said first slide is forcefully continually held in contact with said nosepiece by means of a compression spring having one end fixed to said housing and its opposite end fixed to the other of said ends of said slide.

4. A radius measuring microscope as recited in claim 2 wherein said index means comprises a second slide bearing an index line, said second slide being adjustable in said housing along said first slide independently thereof.

5. A radius measuring microscope as recited in claim 4 wherein said scale is formed of transparent material having opaque graduations therealong and said second slide is disposed substantially immediately behind said scale with said index line viewable therethrough.

6. A radius measuring microscope as recited in claim 5 including means for adjusting said second slide along said first slide at least to the extent of an increment of said graduations.

7. A radius measuring microscope as recited in claim 1 wherein said optical projection means includes an objective lens within said housing adjustable independently of said optical assemblage for focusing said image of said scale and index means in said eyepiece.

8. A radius measuring microscope as recited in claim 7 including light reflecting means forming an optical path through said objective lens.

9. A radius measuring microscope as recited in claim 8 wherein said optical path is illuminated by said vertical illuminator.

10. A radius measuring microscope as recited in claim 8 including means for adjusting the position of said objective lens in said optical path.

References Cited

UNITED STATES PATENTS

| 2,466,015 | 4/1949 | Ewing | 356—156 |
| 3,019,708 | 2/1962 | French et al. | 356—126 |
| 3,398,630 | 8/1968 | Dakin | 356—161 |

FOREIGN PATENTS

| 1,257,537 | 1960 | France. |

RONALD L. WIBERT, Primary Examiner

J. ROTHENBERG, Assistant Examiner

350—10, 39, 84, 91, 110, 238